Patented Mar. 8, 1949

2,464,056

UNITED STATES PATENT OFFICE 2,464,056

POLYMERIC COMPOSITIONS

Alphonse Pechukas, Akron, Ohio, assignor to Pittsburgh Plate Glass Company, Pittsburgh, Pa., a corporation of Pennsylvania No Drawing. Application February 29, 1944, Serial No. 524,485

5 Claims. (Cl. 260—463)

This invention relates to polymers of the chloroformates of unsaturated alcohols and more particularly to the chloroformates in which the unsaturated linkage is in an aliphatic carbon chain between the second and third carbons from an ester linkage. The new compositions have valuable properties as are described hereinafter.

One purpose of this invention is to provide new polymers of unsaturated chloroformates for use as coating compositions, adhesives, or impregnating agents. Such compositions are intermediate compositions capable of subsequent modification by reaction of the chloroformate radical.

Another purpose of this invention is to provide a means of preparing liquid polymeric compositions capable of rapid polymerization to an insoluble and infusible plate.

The chloroformates containing actively polymerizable radicals are quite unstable. When heated with benzoyl peroxide, acetone peroxide, and other similar catalysts, the chloroformates are decomposed. Heretofore attempts at preparation of such polymeric compounds in pure state have not been successful.

I have now invented a simple economical method by which the polymers of chloroformates, such as allyl chloroformate, may be prepared in pure state.

If allyl chloroformate or the corresponding chloroformates of other substituted allyl alcohols are heated at moderate temperatures in the presence of an organic percarbonate the polymers are prepared without substantial loss by decomposition. Temperatures between 30° C. and 60° C. are preferred. However, slightly higher and lower temperatures may be used in some instances. The organic percarbonates which are effective catalysts in this range of temperatures are prepared by the reaction of hydrogen peroxide or sodium peroxide with alkyl chloroformates to form compounds such as ethyl or isopropyl percarbonates. Ordinarily, 0.5 percent to 5 percent of the catalyst is used to induce polymerization. The quantity and type of catalyst used and the presence of inert diluents or polymerization inhibitors, such as air, will determine the temperature required for polymerization. Each set of operating conditions may require different polymerization temperatures which may readily be determined experimentally. The lowest temperature which will enable a controlled reaction temperature, thereby avoiding excessive temperature rises, but which will induce polymerization at a practicable rate, should be used. Generally, the reaction temperature will exceed the bath temperature by 2 to 5° C. The danger of overheating is greater during the first part of the reaction and at that time the removal of the heating medium and sometimes application of cooling baths may be required. Slower polymerization and better control may be had by conducting the reaction in the presence of solvents, such as dioxane, acetone, petroleum ether and chloroform.

Polymers of different molecular size may be obtained by varying the conditions of polymerization. Upon longer heating the polymeric unsaturated chloroformates become more viscous due to the increase in length of the molecule chain. Accordingly, polymeric compositions varying from thin liquids to viscous liquids are produced.

A special modification of this invention utilizes polymeric allyl chloroformate or other polymeric chloroformate as a diluent in polymerizing allyl chloroformate or said other chloroformates. Thus, the beneficial effect of a diluent is obtained without encountering the difficulty of removing the said diluent. Thus, by using a mixture of polyallyl chloroformate and monomeric allyl chloroformate it is possible to obtain a retarded polymerization. The process is adaptable to both batch and continuous operations by dividing the product and returning part to be mixed with more monomer either continuously or intermittently.

The polymeric chloroformates are clear viscous liquids which may be colorless or slightly yellow or brown depending upon the extent of purification. The viscosity of the polymer will vary greatly with the degree of polymerization. Generally, polymers of lower viscosity are more valuable for the principal purpose of this invention although the more viscous are quite useful in the preparation of coating compositions and adhesives, especially when thinned with a suitable solvent.

My invention is applicable to the preparation of polymers of allyl chloroformate, methallyl chloroformate and the chloroformates of other substituted allyl alcohols such as chloroallyl, crotonyl, cinnamyl, tiglyl, chlorocinnamyl, bromoallyl and ethylallyl alcohols. The chloroformates of other monohydroxy alcohols having the unsaturation between the second and third groups from the hydroxyl group such as propargyl and alkyl substituted propargyl and phenylpropargyl alcohols may be used.

The principal use of the polymers of the allyl type chloroformates is for the preparation of partially polymerized materials capable of further polymerization to form insoluble and infusible polymers. By this method polyallyl chloroformate may be reacted with a monohydroxy compound containing a polymerizable unsaturated carbon to carbon linkage in an aliphatic chain. These unsaturated monohydroxy compounds are of several distinct types.

The first type of monohydroxy compounds the simple monohydroxy alcohols such as all methallyl, chloroallyl, crotonyl, tiglyl, propargyl, cinnamyl, and ethyl allyl alcohol, methyl vinyl carbinol and 1-chlorobutene-3-ol-2.

A second type of monohydroxy compound is the monohydroxy ester such as allyl lactate, allyl glycolate, and similar esters of hydroxy acids and alcohols containing polymerizable groups. Other esters such as glycol monoacrylate and the corresponding compounds of other glycols and unsaturated acids are suitable hydroxy esters. Other types of esters such as glycol monoallyl carbonate and analogous compounds may also be used.

Further details of the preparation and use of the new polymeric chloroformates are set forth in the following specific examples:

Example I

Allyl chloroformate (242 g.) was mixed with 3.3 percent isopropyl percarbonate (6.98 g.) and placed in a 500 cc. flask fitted with a thermometer and stirring device. The flask and its contents were heated on a water bath maintained at 43-45° C. for 48 hours. At the end of this period of heating the viscosity had increased approximately 150 times. A slightly yellowish and otherwise clear viscous liquid was obtained.

Example II

A mixture of 242 g. of allyl chloroformate, 242 g. of dioxane, and 15.97 g. of isopropyl percarbonate was placed in a 1000 ml. flask which was provided with a stirring apparatus and a thermometer. The entire assembly was placed in a constant temperature room maintained at 45° C. for 72 hours. The mixture was then washed with water until a constant volume product was obtained. An equal volume of ether was added. The solution was then dried over calcium chloride and filtered. The solvents were removed by heating on a steam bath at 2 mm. total pressure for six hours. A colorless liquid was obtained which possessed a substantially lower viscosity than the product of Example I.

Example III

Methallyl chloroformate was polymerized by heating with 3 percent ethyl percarbonate on a 50° water bath for 24 hours. A liquid polymer of methallyl chloroformate was obtained.

Example IV

Using the procedure of Example II a polymeric allyl chloroformate was prepared in the presence of 2 percent of ethyl percarbonate by heating at 40° C. for 96 hours.

Example V

Polyallyl chloroformate (283 g.) prepared by the method of Example II was added dropwise to a mixture of 283 g. dioxane, 163.6 g. of allyl alcohol, and 222.5 g. of pyridine. The temperature was maintained between 0° C. and 5° C. by cooling the reaction vessel on an ice bath and by adding the polyallyl chloroformate very slowly during the initial portion of the reaction. The reaction mass was stirred while the polyallyl chloroformate was being added and for one hour after the addition was completed. The reaction mixture was diluted with 250 cc. of diethyl ether. After washing thoroughly with water the solution was dried with anhydrous $Na_2SO_4$ and filtered. The solution was evacuated for one hour on a water pump to vaporize the ether and then for 16 hours by means of a Cenco Hyvac pump. A viscous liquid polyallyl allyl carbonate was thereby produced.

A 5 g. sample of the carbonate ester was mixed with 0.1 g. of isopropyl percarbonate and heated for two hours. A tough solid gel was produced.

Example VI

A mixture of 20.9 g. of diethylene glycol monoallyl carbonate and 7.9 g. of pyridine was cooled to 0° C. and added slowly to a mixture of 12 g. of polyallyl chloroformate and 50 cc. of dioxane. The temperature of the reaction mass was maintained between 0 and 5° C. by stirring the reaction mixture vigorously and maintaining the reaction flask submerged in an ice salt mixture. The addition required 45 minutes. The mixture was stirred for an additional 15 minutes after the reaction was completed. The reaction mass was poured into water, washed thoroughly with dilute hydrochloric acid and dissolved in 100 cc. of chloroform. The resulting solution was dried over calcium chloride and filtered. The chloroform was removed by blowing the liquid with air for 12 hours. After evacuating for 6 hours a viscous liquid ester was obtained.

A sample of this material gelled in 45 minutes when heated at 60° C. with 3.3 percent of benzoyl peroxide.

Although the invention has been described with respect to certain specific embodiments, it is not intended that the details thereof shall be regarded as limitations upon the scope of the invention except insofar as included in the accompanying claims.

I claim:

1. The method of claim 4 in which the chloroformate is allyl chloroformate.

2. The method of claim 4 in which the chloroformate is chloroallyl chloroformate.

3. The method of claim 4 in which the chloroformate is methallyl chloroformate.

4. A method of preparing a polymer of a chloroformate of an unsaturated monohydric alcohol containing 3 to 9 carbon atoms and having aliphatic unsaturation between the second and third carbon atoms from the hydroxyl group which method comprises polymerizing the chloroformate in the presence of an organic percarbonate ester.

5. The method according to claim 4 wherein the polymerization is conducted at a temperature of 30 to 60° C.

ALPHONSE PECHUKAS.

REFERENCES CITED

The following references are of record in the file of this patent:

UNITED STATES PATENTS

| Number | Name | Date |
| --- | --- | --- |
| 1,241,738 | Klatte et al. | Oct. 2, 1917 |
| 2,073,363 | Carothers et al. | Mar. 9, 1937 |
| 2,136,178 | Carothers et al. | Nov. 8, 1938 |
| 2,332,900 | D'Alelio | Oct. 26, 1943 |
| 2,338,893 | Bauer et al. | Jan. 11, 1944 |
| 2,370,570 | Muskat | Feb. 27, 1945 |
| 2,374,081 | Dean | Apr. 17, 1945 |

FOREIGN PATENTS

| Number | Country | Date |
| --- | --- | --- |
| 34,412 | France | Jan. 12, 1929 |